United States Patent Office 2,884,135
Patented Apr. 28, 1959

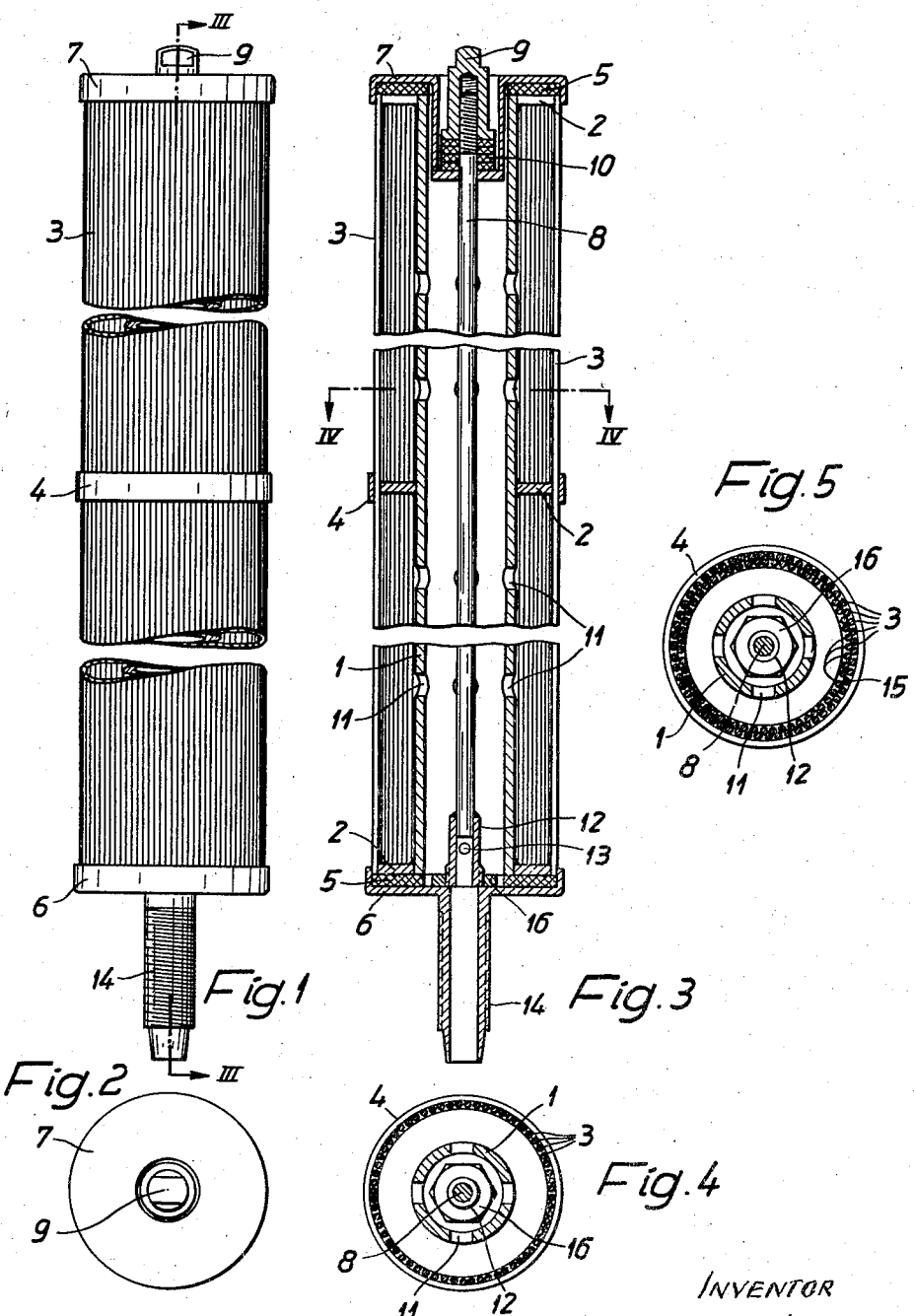

2,884,135

PRECOATED FILTERS FOR LIQUIDS

Wilhelm Nowak, Celle, Germany, assignor to Berkefeld-Filter Gesellschaft und Celler Filterwerke G.m.b.H., Celle, Germany, a German corporation Application May 20, 1955, Serial No. 509,926
In Germany October 3, 1949

Public Law 619, August 23, 1954
Patent expires October 3, 1969

3 Claims. (Cl. 210—457)

My invention concerns pre-coated filters for liquids with supporting bodies having fine slits for the building up of a pre-coat and the subsequently deposited filter mass.

In this specification and appended claims the term "pre-coat filter" indicates that it is the type of filter in which a covering layer of filter material must be precipitated into the carrying member or members of the filter before the filter process commences. In this way the precipitated layer adhering to the carrier performs the actual filtration.

In known pre-coated filters the fine slits are formed of ring discs arranged in horizontal layers on one another between which, owing to unevennesses of the ring surfaces, small distances remain which result in breakage of the pre-coat.

In contrast to this pre-coated filter for liquids according to the invention is characterised in that the supporting body for the pre-coat consists of a plurality of parallel rods extending in vertical or almost vertical direction rigidly fixed and lying against one another. In a preferred construction these parallel rods lying against one another form the jacket of a tubular, such as cylindrical or prismatic, hollow body.

Such a supporting body can be manufactured relatively simply from wire sections of equal length. The permeability of the filter can be varied in a simple manner by using, with a given size of jacket surface, rods of greater or smaller diameter. With thicker rods there is produced correspondingly to the smaller number of rods a smaller number of slits.

Instead of being in one layer only the rods can also be arranged in two or more layers lying closely behind one another. In this case the vertical rods are preferably "nested" that is to say the rods of one layer are staggered relative to the next layer. In this manner the rigidity of the wall of the supporting body is increased. To the same end supports can be provided in the interior of the hollow body formed of the rods, so as to prevent the rods curving inwards under the pressure of the liquid to be filtered.

Filters have been proposed, other than pre-coated filters, in which parallel rods have been arranged side by side with spaces between them which constitute the filter proper. These openings are in the region of 3/100 mm. in width. Such spaces are easily clogged, thereby becoming less useful, and moreover, those filters are not wholly suitable for filtering finely divided and colloidal slurries and the like. The present invention on the other hand aims at providing an improved support in a filter having a filter aid pre-coated on the support for the eventual formation of a filter cake. In this case the width of the openings is in the region of 1/10 mm. (maximum).

The vertical direction of the parallel rods facilitates the gliding down of the filter cake when this cake has to be removed from the surface of the filter candle. Horizontal rods or horizontal layers of wire would render the removal more difficult by reason of the horizontal steps or grooves formed at the surface of the candle by such horizontal layers of wire or of horizontal rods or discs.

The invention will be further described by way of example with reference to the accompanying drawings in which:

Fig. 1 is a side view of a filter according to the invention made in candle form.

Fig. 2 is a plan view of the same filter.

Fig. 3 is an axial longitudinal section on the line III—III of Fig. 1.

Fig. 4 is a cross section taken on the line IV—IV of Fig. 3.

Fig. 5 is a cross section corresponding to Fig. 4 through another construction of filter.

The filter consists of an outflow tube 1 the wall of which is provided with openings 11. On this tube are welded at the ends and in the middle of the filter, washers 2 on the circumference of which are arranged a large number of parallel rods 3 lying against one another, which rods form the jacket of the filter candle. These vertical rods can, according to the use of the filter, be made of different materials for example iron, copper, brass or nonrusting iron alloys. Also rubberised metal rods may be used.

The interior of the filter is divided into several compartments by the washers 2, through which the back flow of the filter is effected. In order that on the back flow the rods 3 may not curve outwards there are provided at one or more places of the filter circumference rings 4 which enclose the rods. These rings preferably lie opposite the washers 2, which are welded or soldered to the rods 3, at the points of contact of the washers and rods.

At both ends of the filter body the vertical rods are cut to equal lengths together with the end washers 2 which are welded or soldered to the ends of the rods, and by the interposition of sealing rings 5 can be pressed against the bottom 6 and the cover 7 of the filter body. A draw rod 8 serves for tensioning the cover 7. The latter may be screwed on the end of the rod 8 by the nut 9 with interposition of sealing discs 10 and pressed against the upper end of the filter candle or against the sealing ring 5. Thereby the lower end of the candle is also pressed against the bottom 6 or the sealing ring 5 lying on the bottom. The lower end of the rod 8 is fastened into a sleeve 12 which has outlet openings 13 and is fastened by means of a nut 16 to the outlet pipe 14.

The construction shown in Fig. 5 has two concentric layers of rods, namely besides the rods 3, a further layer of rods 15 which lie in gaps between the rods 3.

The candles formed in accordance with the invention can be made in length up to 1 metre and over if sufficient numbers of suporting rings are provided.

What I claim is:

1. A pre-coated filter for liquids of the type described comprising an inner tube provided with openings in its side wall, a plurality of annular discs fitting with their inner periphery the outside of said tube and being secured thereto, one of said discs being located at the top end of said tube, another one at the bottom end of said tube, and at least one third disc intermediate the tube ends, an outer tubular jacket coaxial with said inner tube and formed of straight substantially parallel rods as long as said inner tube, said rods being placed very closely side by side so as to prevent the passage of a filter aid between two adjacent rods; said rods being rigidly secured to the outer peripheries of said discs whereby said discs form partitions of the space between said inner tube and said outer jacket, at least one outer ring encompassing said rods intermediate their ends and being rigidly secured to said rods, and an outlet pipe communicating with said inner tube, 2. A pre-coated filter as in claim 1, sealing rings on top and bottom, respectively, of said inner tube, said first and second discs and said tubular jacket, a top and a bottom plate covering said sealing rings, and a tie rod interiorly of said inner tube to urge said top and bottom plates towards each other.

3. A pre-coated filter for liquids of the type described as claimed in claim 1 in which the rigidly fixed rods are arranged in at least two layers lying tightly against one another, the rods in one layer being staggered relative to the rods of the adjacent layer.

References Cited in the file of this patent

UNITED STATES PATENTS

| | | |
|---|---|---|
| 594,013 | Holthaus | Nov. 23, 1897 |
| 2,065,263 | Beldam | Dec. 22, 1936 |
| 2,065,384 | Lomax | Dec. 22, 1936 |
| 2,132,770 | Weidenbacker | Oct. 11, 1938 |
| 2,643,772 | Martin | June 30, 1953 |

FOREIGN PATENTS

| | | |
|---|---|---|
| 703,752 | Great Britain | Feb. 10, 1954 |
| 1,019,011 | France | Jan. 15, 1953 |